US008290898B2

(12) United States Patent
Bowlus et al.

(10) Patent No.: US 8,290,898 B2
(45) Date of Patent: Oct. 16, 2012

(54) INTERACTIVE DATABASE SYSTEMS AND METHODS FOR ENVIRONMENTS WITH HIGH CONCENTRATIONS OF MOBILE USERS

(75) Inventors: Charles C. Bowlus, Sarasota, FL (US); James P. Rice, Jr., Akron, OH (US)

(73) Assignee: Efficient Collaborative Retail Marketing Company, Solon, OH (US)

( * ) Notice: Subject to any disclaimer, the term of this patent is extended or adjusted under 35 U.S.C. 154(b) by 459 days.

(21) Appl. No.: 11/034,565

(22) Filed: Jan. 13, 2005

(65) Prior Publication Data

US 2006/0173752 A1 Aug. 3, 2006

(51) Int. Cl.
*G06F 7/00* (2006.01)
(52) U.S. Cl. ........................................................ 707/610
(58) Field of Classification Search .................... None
See application file for complete search history.

(56) References Cited

U.S. PATENT DOCUMENTS

| | | | | |
|---|---|---|---|---|
| 4,233,661 A * | 11/1980 | Bolton et al. | ................... | 705/30 |
| 4,654,793 A * | 3/1987 | Elrod | ................... | 705/1 |
| 4,806,743 A * | 2/1989 | Thenery | ................... | 235/462.45 |
| 5,262,940 A * | 11/1993 | Sussman | ................... | 705/28 |
| 5,694,393 A * | 12/1997 | Kaye | ................... | 370/408 |
| 5,758,150 A * | 5/1998 | Bell et al. | ................... | 707/10 |
| 5,796,351 A * | 8/1998 | Yabuki | ................... | 340/825.69 |
| 5,857,201 A * | 1/1999 | Wright et al. | ................... | 707/104.1 |
| 5,870,759 A * | 2/1999 | Bauer et al. | ................... | 707/201 |
| 5,870,765 A * | 2/1999 | Bauer et al. | ................... | 707/203 |
| 5,873,096 A * | 2/1999 | Lim et al. | ................... | 707/201 |
| 5,884,325 A * | 3/1999 | Bauer et al. | ................... | 707/201 |
| 5,926,816 A * | 7/1999 | Bauer et al. | ................... | 707/8 |
| 6,078,928 A * | 6/2000 | Schnase et al. | ................... | 707/104.1 |
| 6,199,045 B1 * | 3/2001 | Giniger et al. | ................... | 705/1 |
| 6,249,795 B1 * | 6/2001 | Douglis | ................... | 715/511 |
| 6,253,193 B1 * | 6/2001 | Ginter et al. | ................... | 705/57 |
| 6,324,542 B1 * | 11/2001 | Wright et al. | ................... | 707/104.1 |
| 6,363,488 B1 * | 3/2002 | Ginter et al. | ................... | 726/1 |
| 6,389,402 B1 * | 5/2002 | Ginter et al. | ................... | 705/51 |
| 6,427,140 B1 * | 7/2002 | Ginter et al. | ................... | 705/80 |
| 6,446,089 B1 * | 9/2002 | Brodersen et al. | ................... | 707/201 |
| 6,446,092 B1 * | 9/2002 | Sutter | ................... | 707/203 |
| 6,466,951 B1 * | 10/2002 | Birkler et al. | ................... | 707/201 |
| 6,493,727 B1 * | 12/2002 | Huang et al. | ................... | 707/610 |
| 6,557,007 B1 * | 4/2003 | Pekowski et al. | ................... | 707/104.1 |

(Continued)

OTHER PUBLICATIONS

Newton: New Features of the Newton 2.0 Operating System, 1995.*

*Primary Examiner* — Hung Q Pham
*Assistant Examiner* — Hubert Cheung
(74) *Attorney, Agent, or Firm* — Fay Sharpe LLP

(57) ABSTRACT

A database system usable in a high user concentration environment includes a central database containing content relating to associated users. Software is configured for loading onto associated portable computers carried by the users. The software when executed on one of the associated portable computers performs a method including: (i) downloading from the central database a selected sub-set of the content before the associated portable computer enters the high user concentration environment; (ii) generating modifications or additions to the downloaded sub-set of the content; and (iii) at least while the associated portable computer is within the high user concentration environment, occasionally wirelessly connecting with the central database to upload at least some of the generated modifications or additions to the central database and to download other modifications or additions to the selected sub-set of content.

14 Claims, 5 Drawing Sheets

U.S. PATENT DOCUMENTS

| | | | |
|---|---|---|---|
| 6,785,868 B1 * | 8/2004 | Raff | 715/530 |
| 6,847,940 B1 * | 1/2005 | Shelton et al. | 705/26 |
| 6,850,901 B1 * | 2/2005 | Hunter et al. | 705/26 |
| 7,840,528 B2 * | 11/2010 | Agrawal et al. | 707/609 |
| 7,865,463 B2 * | 1/2011 | Sollicito et al. | 707/610 |
| 7,930,269 B2 * | 4/2011 | Hindle et al. | 707/610 |
| 2003/0131252 A1 * | 7/2003 | Barton | 713/193 |
| 2004/0073679 A1 * | 4/2004 | Martens et al. | 709/227 |

* cited by examiner

INTERACTIVE DATABASE SYSTEMS AND METHODS FOR ENVIRONMENTS WITH HIGH CONCENTRATIONS OF MOBILE USERS

BACKGROUND

The following relates to the information storage, distribution, and processing arts. It especially relates to providing interactive personalized database access for use at trade shows and other collaborative retailing environments, and will be described with particular reference thereto. However, the following will also find application more generally in creating and maintaining personalized wireless database access in environments having high concentrations of mobile users.

Databases are widely used in business, government, technology, and other applications. Initially, databases were highly centralized and wired, typically including a central server accessed by "dumb" terminals hard wired to the server. As database content and the number of accessing users increases, such a centralized database topology becomes problematic, as users experience frequent bottlenecks, access time-outs, and so forth.

As a way to reduce such bottlenecks, distributed database topologies are sometimes employed. In distributed databases, a central database server pushes data to remote servers. Users access the remote servers to interact with the database. By providing a number of remote servers, user load is distributed amongst the servers, reducing bottlenecks.

The remote servers are generally stationary, and do not travel with the user. Although the user may be able to access the remote server via a wireless network, such access can be intermittent depending upon the wireless coverage area, the mobility of the user, the load on the wireless service and the database server, and so forth. If the wireless connection is lost, the user cannot access the database.

Moreover, server access in distributed systems is generally not personalized with respect to information content. Rather, each remote server typically receives a substantial fraction of the total content of the central database, so as to service a large number of users with diverse database needs. In some database configurations, limited personalization is provided by generating server-side or client-side cookies that contain information about a specific user's preferences.

None of these solutions are suitable for environments containing a high concentration of mobile users each desiring personalized database access. One example of such an environment is a retail marketing trade show. Such a trade show typically attracts hundreds or thousands of buyers and sellers. At a major trade show, buyers may represent regional, national, or global retail outlets, such as department store chains, that endeavor to line up purchase contracts for a large number of product types from a large number of sellers. Similarly, sellers may represent major wholesalers endeavoring to sell a wide range of product lines to many different buyers. Sales contracts initiated or concluded at major trade shows often account for a large proportion of total sales for sellers, and similarly purchase contracts initiated or concluded at major trade shows often account for much of the product inventory offered for sale by retailers. Accordingly, it is mutually beneficial for both buyers and sellers to conduct business efficiently at such trade shows.

Existing database topologies, including distributed databases, are generally unsuitable for providing interactive database access at trade shows and other events attended by large numbers of mobile users. It is impractical to wire the numerous trade show booths, hotel rooms, hallways, and other locations where business transactions may occur. Wireless access to a distributed database is also problematic. A large trade show held in a hotel, convention center, or other venue may involve thousands or tens of thousands of buyers and sellers. Such a large volume of mobile users attempting to maintain wireless connections with a distributed database through a wireless local area network will quickly overload the network, creating delays, broken connections, and other disruptions that can lead to lost sales and frustrated participants. Moreover, some transactions may occur outside of the range of the wireless network, for example at nearby restaurants or nearby hotels not covered by the wireless local area network.

Moreover, the lack of personalization of typical distributed databases is problematic in a trade show environment. Typically, buyers have complex forms that must be completed by the seller in order to initiate a transaction. In most transactions, the buyer will have its own personalized forms, which must be properly filled out with the seller's specific information. Accessing the distributed database to acquire the buyer's forms and the seller's information is generally unmanageable in a high density trade show environment where hundreds of complex transactions are occurring substantially simultaneously.

The following contemplates improved apparatuses and methods that overcome the above-mentioned limitations and others.

BRIEF SUMMARY

According to one aspect, a database system is disclosed for use in a high user concentration environment. A central database contains content relating to associated users. Software is configured for loading onto associated portable computers carried by the users. The software when executed on one of the associated portable computers performs a method including: (i) downloading from the central database a selected sub-set of the content before the associated portable computer enters the high user concentration environment; (ii) generating modifications or additions to the downloaded sub-set of the content; and (iii) at least while the associated portable computer is within the high user concentration environment, occasionally wirelessly connecting with the central database to upload at least some of the generated modifications or additions to the central database and to download other modifications or additions to the selected sub-set of content.

According to another aspect, a database management method is provided for use in a high user concentration environment. Prior to entering the high user concentration environment, a selected sub-set of content of a central database is downloaded to a portable computer. Modifications or additions to the downloaded sub-set of the content are generated at the portable computer. At least while the portable computer is within the high user concentration environment, the portable computer occasionally wirelessly connects with the central database to upload at least some of the generated modifications or additions to the central database and to download other modifications or additions to the selected sub-set of content from the central database to the portable computer.

According to yet another aspect, a storage medium is disclosed storing software configured for loading onto associated portable computers. An instance of the software executing on one of the associated portable computers performs a database method including (i) downloading from an associated central database containing content relating to the associated users a selected sub-set of the content; (ii) generating modifications or additions to the downloaded sub-set of the content; and (iii) at least while the associated portable computer is within a high user concentration environment, occasionally wirelessly connecting with the associated central database to upload at least some of the generated modifications or additions to the associated central database and to download other modifications or additions to the selected sub-set of content.

Numerous advantages and benefits will become apparent to those of ordinary skill in the art upon reading and understanding the present specification.

BRIEF DESCRIPTION OF THE DRAWINGS

The drawings are only for purposes of illustrating preferred embodiments and are not to be construed as limiting.

DETAILED DESCRIPTION OF PREFERRED EMBODIMENTS

Figure 1:
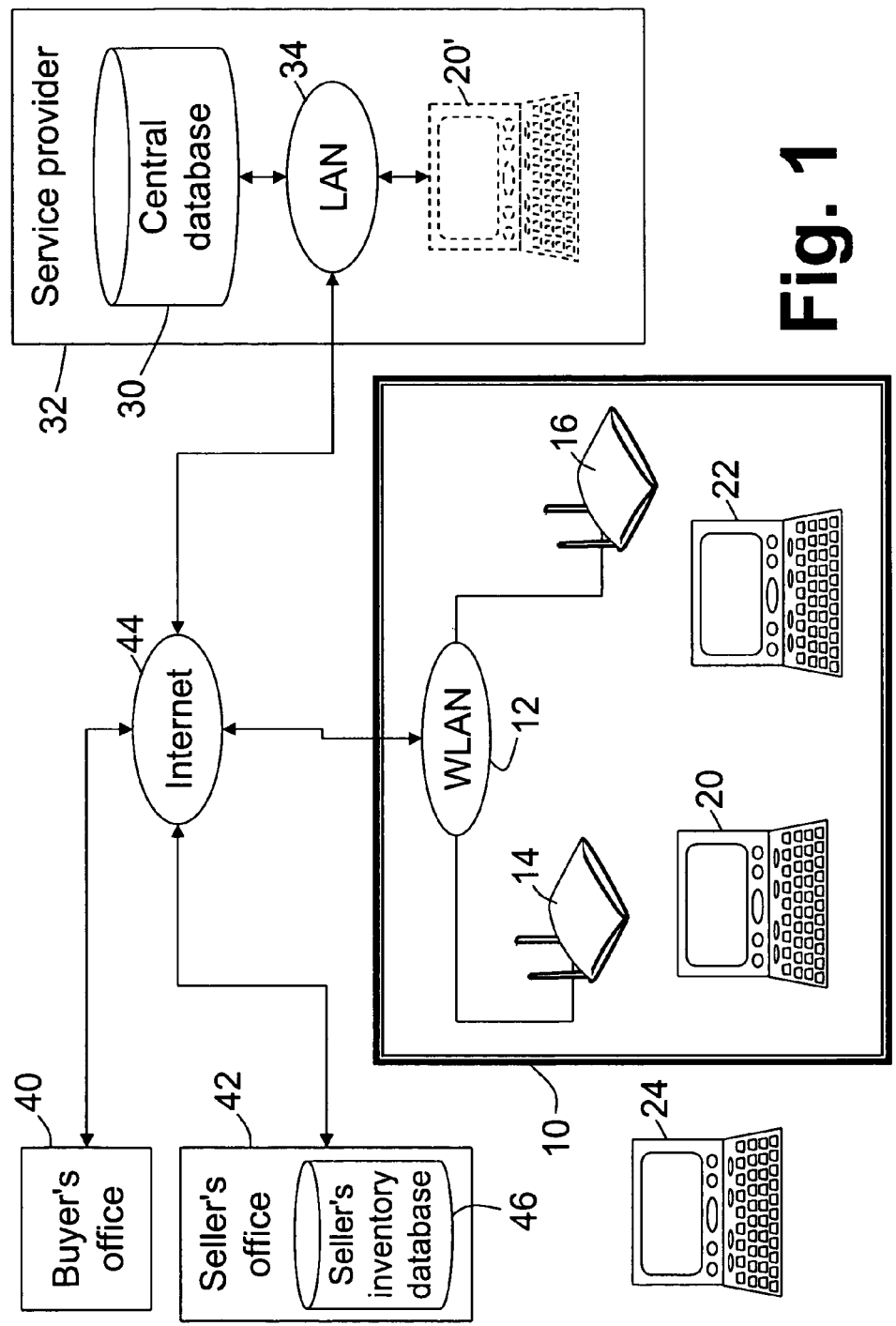
FIG. 1 shows a distributed and personalized database system for use in a high user concentration environment.

With reference to FIG. 1, a high user concentration environment 10, which in the example embodiment is a trade show environment, includes a wireless local area network (WLAN) 12. For example, the trade show environment 10 may be a hotel or a conference center that includes the WLAN 12 providing wireless coverage in public meeting areas, in hotel rooms, or so forth. The WLAN 12 is accessed via wireless access points, such as the illustrated wireless access points 14, 16, that are distributed through the covered areas of the trade show environment 10. The coverage may span substantially the entire trade show environment 10, or may span only selected portions thereof, such as only the public meeting areas.

The trade show attracts a large number of users. Each user is typically a representative of a buyer, or a representative of a seller. The trade show brings together a high concentration of buyers and sellers for the purpose of meeting and generating proposals or agreements on purchase or sale of products. Since the trade show is of limited duration (typically one or two weeks or shorter) each seller is attempting transact business with a large number of buyers, and each buyer is attempting to transact business with a large number of sellers, all in a limited period of time. This calls for efficient scheduling, efficient presentation of seller's products to each potential buyer, rapid consideration of any discounts or other buyer-specific aspects of the proposed transaction, efficient handling of the purchase forms or other paperwork involved in proposed or consummated transactions, and so forth and efficient record keeping of all transactions as well as information on post-conference follow-up issues.

To facilitate such trade show activities, each user (e.g., buyer representative or seller representative) carries a portable computer, such as the example portable computers 20, 22, within the trade show environment 10. Each portable computer is typically a laptop computer, a tablet computer, a personal data assistant (PDA), or so forth. Each of the portable computers 20, 22 has the capability of connecting with the WLAN 12; however, each of the portable computers 20, 22 also operates generally independently of WLAN connection. Thus, for example, another portable computer 24 which has been taken out of the trade show environment 10 continues to operate even though it is out of range of the WLAN 12. The portable computer 24 may, for example, be carried by a buyer who engaged in a lunchtime meeting with a seller at a restaurant outside of the trade show environment 10.

Prior to being taken into the trade show environment 10, each portable computer 20, 22, 24 is initially prepared for the trade show by downloading a selected sub-set of content from a central database 30 containing information about buyers and sellers who are sending representatives to the trade show. The selected sub-set of content downloaded to each portable computer 20, 22, 24 is personalized; that is, it is in general unique for each user. For example, a portable computer carried by a buyer's representative receives content relating to sellers with whom the representative intends to do business at the trade show, as well as content related to the buyer's inventory requirements which are sought to be filled at the trade show. Similarly, a portable computer carried by a seller's representative receives content relating to buyers with whom the representative intends to work, as well as content relating to the seller's products. Additionally, there is generally some common information that is loaded onto each of the portable computers 20, 22, 24—for example, the sub-set of content loaded onto each portable computer 20, 22, 24 preferably includes a list of attendees, a list of events, and other information of general interest to all trade show participants.

In the illustrated embodiment, a service provider 32 maintains the central database 30. The service provider 32 may be the trade show promoter, or the service provider 32 may be another organization that contracts with the promoter of the trade show, or the service provider 32 may be an organization that directly contracts with individual buyers and sellers participating in the trade show to provide database services for promoting collaborative retail marketing at the trade show. The service provider 32 maintains the central database 30 with information provided by buyers and sellers. This information may include, for example: names and contact information for the participants' representatives at the trade show; a list of products marketed by each seller including relevant details such as price, UPC code, and so forth; a list of inventory requirements for each buyer; blank purchase forms for each buyer; and so forth. This information is suitably communicated to the service provider 32 from the participants' businesses, such as from the illustrated example buyer's office 40 and from the illustrated example seller's office 42, via the Internet 44 and the service provider LAN 34. As an example, the seller's office 42 pulls product information from its internal inventory database 46 and sends it to the service provider 32.

The received data is formatted and entered into the central database 30. In some embodiments, the formatting is done automatically by dedicated software provided to the participants' offices 40, 42 by the service provider 32 for the purpose of updating the participants' information at the central database 30. In other embodiments, the service provider 32 receives the data in an arbitrary format, and manually reformats and enters the received data into the central database 32. While the central database 30 is illustrated as a singular unit, in some other embodiments the central database includes remote servers for more efficient access to the database over the Internet 44.

In the illustrated embodiment, the portable computers 20, 22, 24 are provided to the buyers and sellers by the same service provider 32 that also maintains the central database 30. As shown in phantom as computer 20', the portable computer 20 is initially located at the site of the service provider 32, and is connected with the central database 30 via a local area network (LAN) 34. The service provider 32 loads the portable computer 20' with that sub-set of the content of the database 30 that is relevant to the user who will carry the portable computer 20. Similarly, each of the other computers 22, 24 is similarly pre-loaded at the service provider 32 before being given to respective trade show participants. The sub-set of content loaded onto each portable computer 20, 22, 24 is personalized to conform with the particular user who will be carrying that portable computer at the trade show.

In the embodiment illustrated in FIG. 1, the service provider 32 provides each trade show participant with a pre-loaded portable computer. In some other embodiments, each user brings his or her own computer, which is owned by the user or the user's organization rather than being owned by the service provide 32. In these embodiments, the user connects the portable computer with the central database 30 via the Internet 44 and downloads the initial sub-set of content from the central database 30 onto the portable computer. Typically, the service provider 32 will supply each participant with software that the participant can run on his or her portable computer to connect with the central database 30 and download selected content.

FIG. 1 gives an overview of the components of the database system. Each portable computer 20, 22, 24 has software loaded onto it which enables initial downloading of a personalized sub-set of content of the central database 30 that is personalized with respect to the corresponding user. The software also provides database functionality for the user, including the ability to view, modify, or add to the downloaded sub-set of content, in a manner which does not require a continuous connection with the central database 30. Still further, the software loaded onto each portable computer 22, 24, 26 occasionally attempts to wirelessly connect with the central database 30 and, when successfully connected, synchronizes the sub-set of content on the portable computer and the database 30.

It will be appreciated that the software may be embodied in various ways. In embodiments in which the service provider 32 supplies each trade show participant with his or her portable computer, the software is typically pre-loaded onto a hard drive or other non-volatile storage medium of the portable computer. In other embodiments, the software may be supplied to the participant user on another non-volatile storage medium such as an optical disk, a magnetic disk, a FLASH memory or other solid state memory, or so forth, and the user then loads the software onto the portable computer where it is stored on the computer hard drive or other non-volatile memory associated with the computer. In yet other embodiments, the software is stored in non-volatile memory at the location of the service provider 32, and a copy of the software is downloaded by each participant user via the Internet 44 and loaded onto the portable computer where it is stored on the computer hard drive or other non-volatile memory.

Having described example embodiments of the overall database system, some example embodiments of the method performed by an instance of the software executing on one of the portable computers 20, 22, 24 is next described. These embodiments are described with reference to an example instance of the software executing on the portable computer 20; however, the software loaded onto each of the portable computers 20, 22, 24 is generally similar in operation, although the behavior will differ on each portable computer due to the differing sub-sets of content loaded onto each. In some embodiments, the different users may carry different types of portable computers, such as MICROSOFT WINDOWS software for laptop computers, APPLE software for laptop computers, PDA's, and so forth. In such embodiments, different versions of the software are loaded onto the different types of portable computers to perform substantially similar functions.

Figure 2:
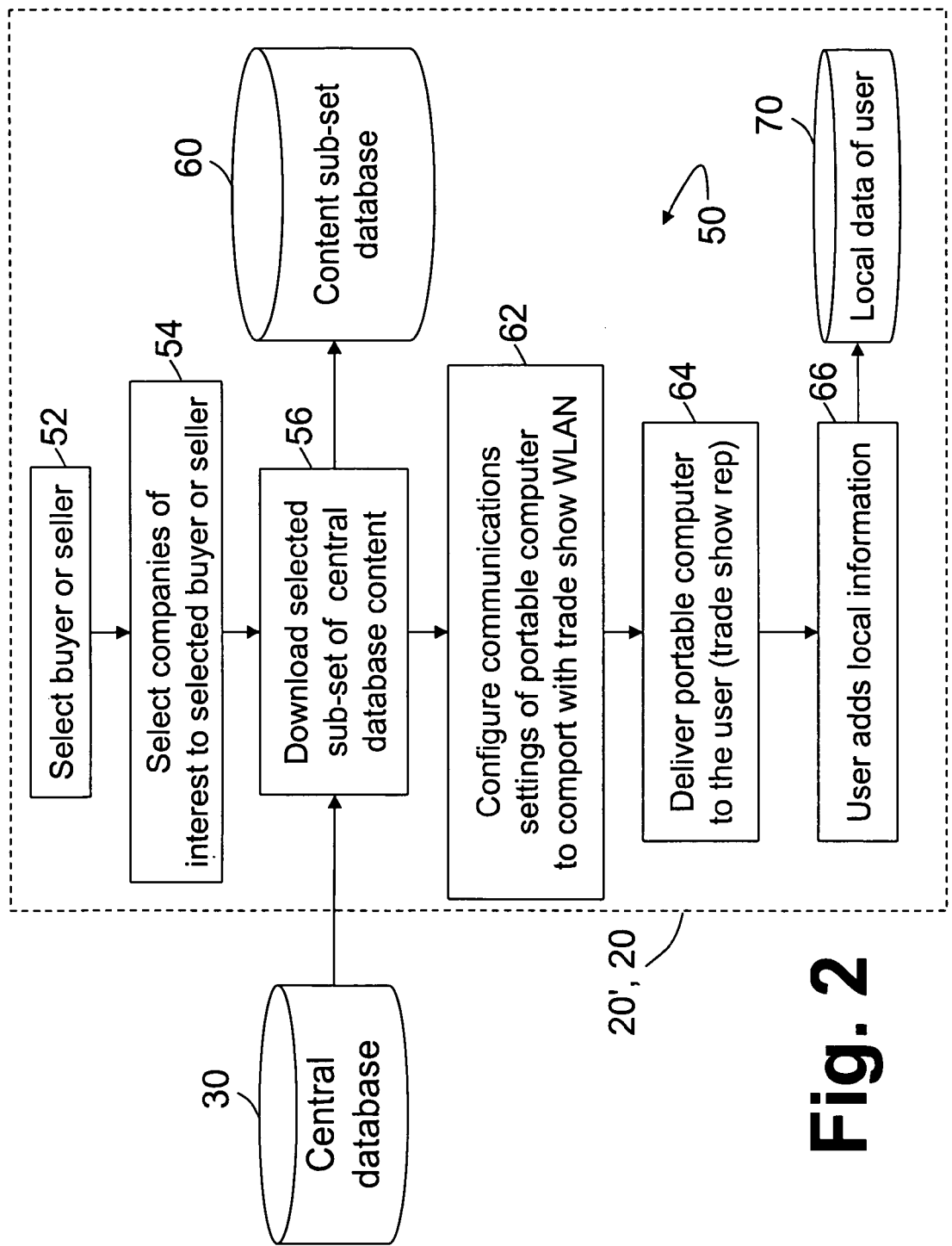
FIG. 2 shows an initialization method performed on one of the portable computers of the database system of FIG. 1.

With reference to FIG. 2, an initialization process 50 for initializing the portable computer 20' begins by selecting in a process operation 52 which participant user will be carrying the portable computer 20, and by selecting in a process operation 54 which companies are of interest to the user. These selections 52, 54 enable the sub-set of content loaded onto the computer 20' to be personalized. For example, if the user carrying the portable computer 20 is a buyer representative of a chain of retail hardware stores, the selection operation 54 may select sellers who sell tools, nails, screws, gaskets, and other products carried by the retail hardware store chain. Not all such sellers are necessarily included, however—for example, if the buyer has had prior bad experiences with a certain supplier, that supplier may be omitted from the list of companies selected in operation 54.

In a process operation 56, a selected sub-set of content is downloaded from the central database 30 to the portable computer 20'. The selected sub-set of content includes information about the participant user selected in the operation 52 (such as inventory requirements or products offered for sale, blank forms, and so forth), information about the companies selected in selection operation 54, and general-interest information such as a comprehensive list of trade show attendees, a list of trade show events, and so forth. The downloaded sub-set of content is stored as a content sub-set database 60 stored at the portable computer 20. The content sub-set database 60 is personalized and generally different for each of the portable computers 20, 22, 24.

Additionally, in a process operation 62 the communications settings of the WLAN communication interface of the portable computer 20 are set up to comport with the WLAN 12 of the trade show environment 10. WLAN communication protocols are becoming more standardized—hence, in some embodiments in which wireless local area networking is sufficiently standardized or has been reduced to automated "plug-and-play" compatibility, the configuration operation 62 may be omitted.

In the embodiment illustrated in FIG. 1, the process operations 52, 54, 56, 62 are performed at the service provider 32, i.e., are performed on the portable computer 20' representing the portable computer 20 at the service provider 32. After creation of the content sub-set database 60 and configuration of the communication interface, the portable computer 20' is delivered in process operation 64 to the participant user, thus henceforth corresponding to the portable computer 20 of FIG. 1. Optionally, the participant user may choose to add additional information not included in the central database 30 in a process operation 66 to create a local user database 70. This additional information is not shared with the central database 30, but rather only resides locally on the portable computer 20. In contrast, the content sub-set database 60 is also stored locally on the portable computer 20, but is derived from and occasionally synchronized with the central database 30. The data stored in the local user database 70 may include, for example: personal notes about other participants; pricing information such as a maximum per-unit price the participant buyer is willing to pay for an item; private communications with the home office; a personal agenda of non-trade show activities; and so forth.

Figure 3:
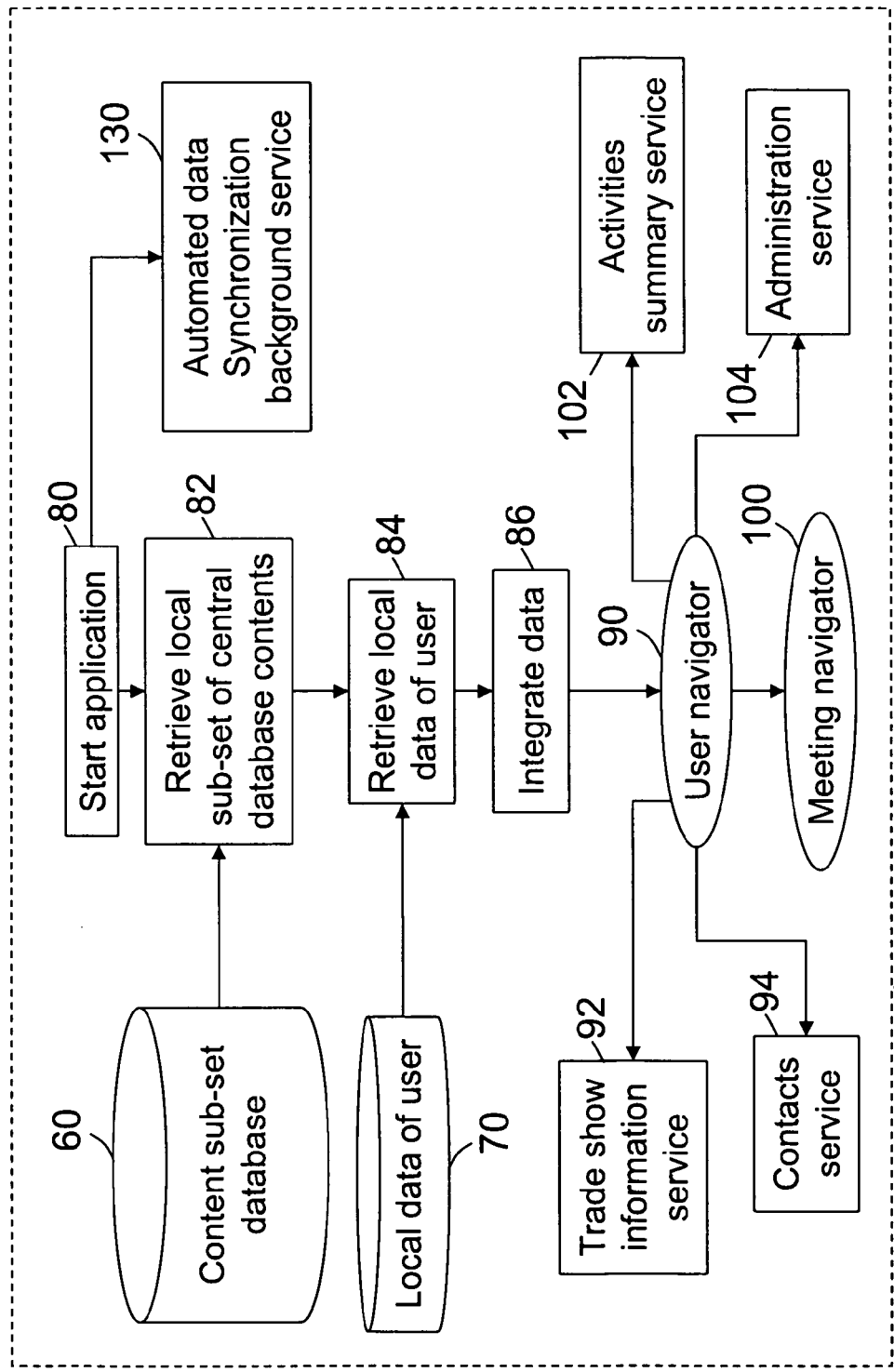
FIG. 3 shows an interactive database access method performed on one of the portable computers of the database system of FIG. 1.

With reference to FIG. 3, the portable computer 20 having been pre-loaded, configured, and delivered to the participant user as set forth in the method 50 of FIG. 2, is now brought by the participant user to the trade show. At the trade show, the user starts the application software in a process operation 80. In a process operation 82, the contents of the content sub-set database 60 are loaded into memory. Optionally, in a process operation 84, local data is loaded into memory from the local user database 70, and the local data is integrated in memory with the contents of the content sub-set database 60 in an integration process operation 86. The software then presents the user with a navigator service 90, such as a user menu, that allows the user access to various trade show-related services. For example, a trade show information service 92 enables the user to review information about the trade show that is of general interest to many participants, such as: hotel information; a list of attendees; general help information; agenda information such as a meals schedule; and so forth. This information is typically included in the general interest content component of the sub-set of content stored in the content sub-set database 60.

An example contacts service 94 provides information on conference attendees, and may be used in selecting potential buyers or sellers to attempt to contact. In some embodiments, the contacts service 94 provides a searchable list of attendees that can be searched by name, line-of-business, geographical location, or other suitable criteria. The contacts information is also typically included in the general interest content component of the sub-set of content stored in the content sub-set database 60. Optionally, the contacts may be supplemented by additional contacts included in the local user database 70. Such supplemental contacts may include, for example, internal contacts of the company represented by the user, or contact information for family members. Optionally, the contacts service 94 also provides for editing of contact information. Thus, for example, new contacts can be added.

An example meetings navigator service 100 provides access to a plurality of services that are useful for setting up meetings with potential buyers or sellers, for recording notes of a meeting, for selecting products for sale or purchase, for preparing paperwork for a proposed sales or purchase contract, or so forth. An example activities summary service 102 provides the ability to review meeting notes, to review statistics for product sales or purchases at the trade show, to review purchase forms, or so forth. An example administration service 104 enables the user to update the list of companies whose information is to be included in the sub-set of content downloaded from the central database 30, to communicate data to and from the home office, and so forth.

Figure 4:
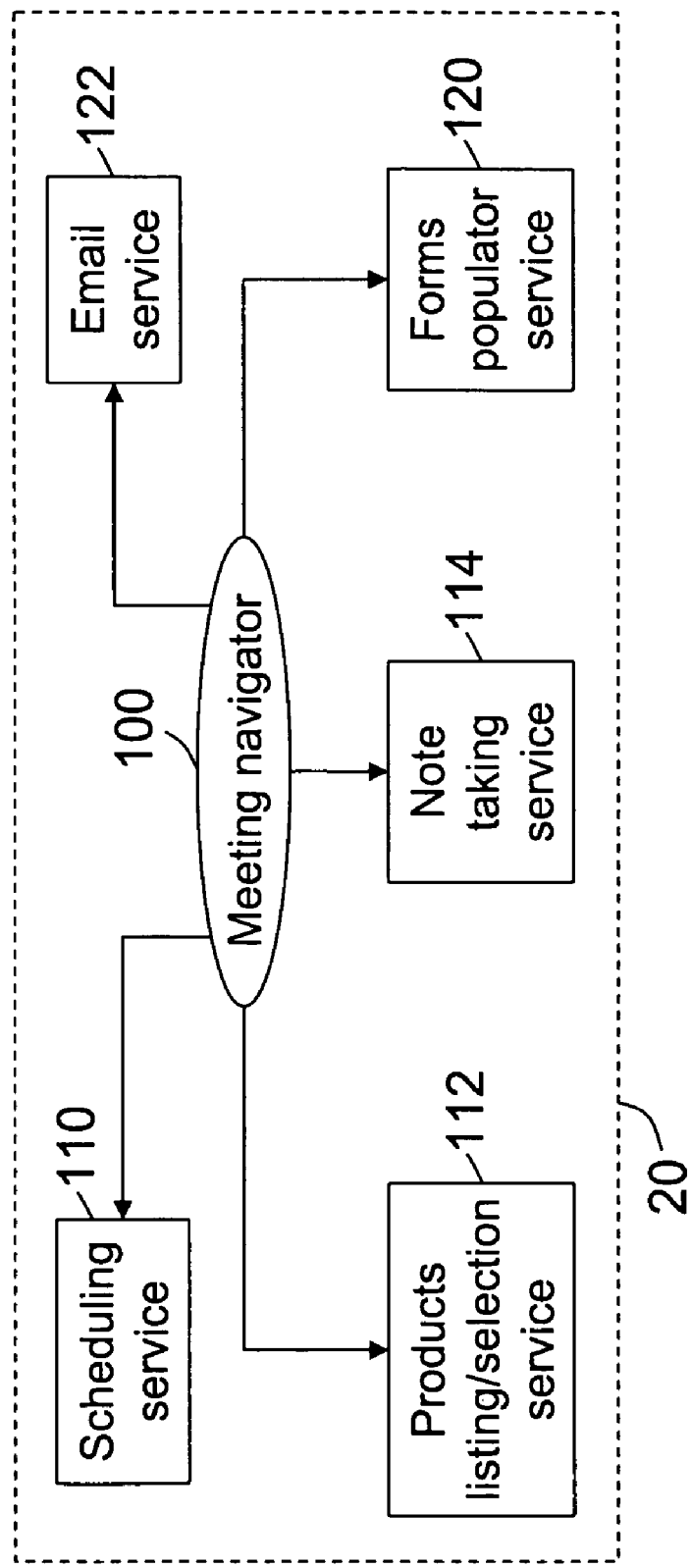
FIG. 4 shows a meeting navigator method performed on one of the portable computers of the database system of FIG. 1.

With reference to FIG. 4, some example services suitably accessible via the meetings navigator service 100 are described. A scheduling service 110 enables the user to attempt to schedule meetings with buyers or sellers. In one approach, the user selects a proposed day, time, and location for a meeting, and this proposal information is stored on the portable computer 20. The next time the portable computer 20 connects with the WLAN 12, the meeting proposal information is forwarded to the intended recipient. Similarly, the scheduling service 110 may receive a meeting proposal over the WLAN 12, and present the proposed meeting to the user for confirmation, rejection, or suggestion of a modified time and/or place. Assuming a meeting is set up, the user goes to the meeting carrying the portable computer 20.

At the meeting, the user may access a products listing/selection service 112 to review the specifications of products of interest offered by the seller. The products listing/selection service 112 optionally provides customized listing information for certain "preferred" buyers, such as preferred-customer discounts, volume discounts, special-availability products, and so forth. During the meeting, the user may employ a note-taking service 114 to record notes about proposed transactions. In some embodiments, the note-taking service 114 provides both public and private note-taking areas on the display. The public notes are integrated into the sub-set of content stored in the content sub-set database 60, whereas the private notes are integrated into the private user database 70.

If the meeting consummates into a proposed transaction, the user may access blank forms of the buyer. Such forms are often complex and time-consuming to fill out. Accordingly, a forms populating service 120 provides automated populating of entries of the form. To do this, the form includes links or indicators indicating the content that should go into each line, such as seller name, seller address, product UPC code, product description, etc. The portable computer 20 includes such content as part of the sub-set of content downloaded from the central database 30 and/or content contained in the local user database 70; accordingly, the forms populating service 120 is able to replace the links or indicators of the form with the corresponding content pertaining to the seller. In some embodiments, the forms are MICROSOFT EXCEL spreadsheets, and the forms populating service 120 includes EXCEL macros that perform the populating. An email service 122 can be used to email the populated form to the seller's office 42 to begin processing of the order. Similarly, the email service 122 or another wireless communication operating via the WLAN 12 can be used to update the seller's inventory listing on the content sub-set database 60 from the sellers inventory database 46.

With reference to FIGS. 1, 3, and 4, it is to be appreciated that the process operations 80, 82, 84, 86, 90, 92, 94, 100, 102, 104, 110, 112, 114, 120, 122 are generally performed "off-line", that is, without being connected with the central database 30. Accordingly, if for example a meeting with a potential buyer or seller is conducted off-site or in some other location that is out of range of the WLAN 12, the portable computer 20 continues to be usable by the person carrying it to conduct meeting business, to obtain contact information, to review the trade show agenda, and so forth. Some of these activities may involve changing the sub-set of content stored at the content sub-set database 60. For example, meeting proposals, populated forms, and so forth all constitute changes to the sub-set of content of the central database 30. Moreover, such changes may be generated by one of the other portable computers 22, 24—for example, one of the other portable computers may generate a meeting proposal directed toward the user carrying the portable computer 20. Still further, other sources may change the contents of the central database 30. For example, the trade show organizers may update the agenda, or the seller's home office 42 may modify the products list at the central database 30 based on changes in contents of the seller's inventory database 46. As a result, the content sub-set database 60 may become unsynchronized with the central database 30.

Figure 5:
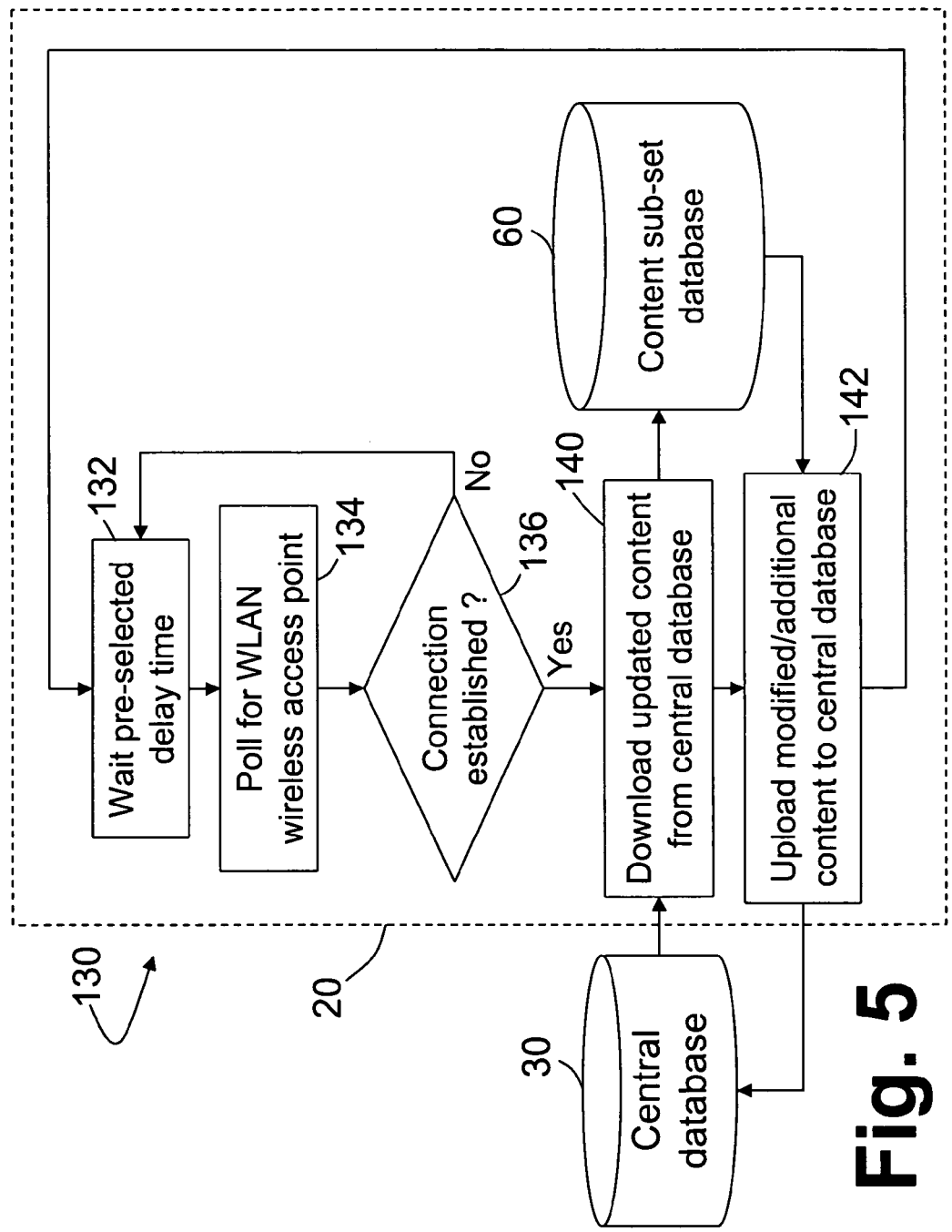
FIG. 5 shows a background synchronization process performed on one of the portable computers of the database system of FIG. 1.

With reference to FIGS. 3 and 5, an automated data synchronization background service 130 occasionally attempts to connect with the WLAN 12. In the illustrated approach, after a pre-selected delay time 132 the portable computer 20 polls for a WLAN connection in a polling process operation 134. At a decision operation 136, if the WLAN connection is not established, the synchronization background process 130 returns to the delay operation 132 to await another pre-selected time delay. This occasional polling repeats until a WLAN connection is established. When the decision operation 136 determines that a WLAN connection has been established, a synchronization download operation 140 follows in which the portable computer 20 downloads changed or additional portions of the selected sub-set of content from the central database 30 into the content sub-set database 60 stored on the portable computer 20. Similarly, in a synchronization upload operation 142 the portable computer 20 uploads changed or additional portions of the selected sub-set of content stored at the content sub-set database 60 to the central database 30. The synchronization background process 130 then returns to the delay operation 132 to await another pre-selected time delay.

The illustrated embodiments relate to highly distributed and personalized databases used in trade show environments. Those skilled in the art can readily adapt the illustrated embodiment to other high user concentration environments, such as scientific conferences, job fairs, corporate annual shareholders' meetings, and so forth.

The preferred embodiments have been described. Obviously, modifications and alterations will occur to others upon reading and understanding the preceding detailed description. It is intended that the appended claims be construed as including all such modifications and alterations insofar as they come within the scope of the appended claims or the equivalents thereof.

The invention claimed is:

1. A method used in a computing network with access to a database system for use in a high user concentration environment having over a hundred users concentrated in a retail marketing trade show environment comprising:

a wireless local area network (WLAN) including wireless access points distributed throughout at least a portion of a trade show meeting area, the trade show meeting area defined as the interior of a building;

a plurality of portable computers configured to be wirelessly carried by the over a hundred users within the trade show meeting area, each of the plurality of portable computers configured to connect to the WLAN and to also operate independently of the WLAN and at least some of the portable computers are supplied to at least some of the over a hundred users at the trade show meeting area by a service provider;

a central database containing content relating to associated users at the trade show meeting area; and software configured for loading onto associated portable computers of the plurality of portable computers carried by the over a hundred users, the software when executed on one of the portable computers performing steps comprising:

(i) downloading from the central database a selected sub-set of the content before the one of portable computers connects to the WLAN, the selected sub-set of the content being trade show content that is personalized to individual users and including information common to all users including a list of attendees and daily events, and specific information to a particular user, wherein prior to a connection to the WLAN each associated portable computer is configured according to a single configuration specific to only one participant, and wherein the specific information includes data to:
 (1) generate proposals and agreements for purchase and sale of products;
 (2) schedule meetings;
 (3) perform recordkeeping; and
 (4) identify and memorialize follow-up issues;

(ii) generating modifications or additions to the downloaded selected sub-set of the content; and (iii) at least while the one of the portable computers is within the trade show meeting area, occasionally wirelessly connecting, via the WLAN, with the central database for synchronization, which includes uploading at least some of the generated modifications or additions to the central database and downloading other modifications or additions to the downloaded selected sub-set of the content, wherein the downloading operation (i) and the wirelessly connecting operation (iii) each include:
 connecting the one of the portable computers with the central database via an Internet connection; and
 wherein the connection of the one of the portable computers via the Internet connection permits the one of the portable computers (1) to retrieve product price, universal product code and inventory data, (2) to send a populated sales form to a seller's office to begin processing of an order while the one of the portable computers is within the high user concentration environment, and (3) to update a seller's inventory listing on a content sub-set database from data located on an inventory database, of the seller, remote from the high user concentration environment;

(iv) integrating a local information stored on the one of the portable computers with the downloaded selected sub-set of the content; and (v) providing the particular user carrying the one of the portable computers with access to both the local information and the downloaded selected sub-set of the content, wherein contact information of the local information and/or the downloaded selected sub-set of the content is searchable; and a local database located on the one of the portable computers carried by the particular user, the local database having local information not shared with or synchronized with the central database, the local information including all of:
 names and contact information of other participants;
 personal notes about other participants;
 maximum per-unit price another participant is willing to pay for an item;
 information for preferred buyers including preferred customer discounts, volume discounts and special available products;
 private communications with a home office; and
 statistics for product sales and purchases.

2. The method as set forth in claim 1, wherein:
the individual users are buyers and sellers in the trade show meeting area, and
the selected sub-set of the content includes content selected from a group consisting of:
(i) information about selected buyers wherein the particular user carrying the one of the portable computers is a seller, and
(ii) information about selected sellers wherein the particular user carrying the one of the portable computers is a buyer.

3. The method as set forth in claim 1, wherein the selected sub-set of the content includes a form associated with a user other than the particular user carrying the one of the portable computers, and the generating operation (ii) includes populating the form with information pertaining to the particular user carrying the one of the portable computers, which the information was pre-loaded onto the one of the portable computers prior to the populating.

4. The method as set forth in claim 1, wherein the wirelessly connecting operation (iii) downloads the modifications or additions to the downloaded selected sub-set of the content previously uploaded to the central database by other associated portable computers.

5. The method as set forth in claim 1, wherein the method performed by execution of the software on the one of the portable computers further includes:
- (iv) connecting with a remote database associated with the particular user carrying the one of the portable computers, the remote database being different from the central database, and
- (v) uploading the at least some of the generated modifications or additions to the remote database associated with the particular user.

6. The method as set forth in claim 5, wherein the generating operation (ii) includes:
- downloading the modifications or additions to the downloaded selected sub-set of the content from the connected remote database.

7. The method as set forth in claim 1, wherein the wirelessly connecting operation (iii) includes:
- polling for a wireless connection at preselected time intervals.

8. A database system for use in a high user concentration environment having over a hundred users concentrated in a retail marketing trade show environment, the database system comprising:
- a wireless local area network (WLAN) including wireless access points distributed throughout at least a portion of a trade show meeting area, the trade show meeting area defined as the interior of a building;
- a plurality of portable computers configured to be wirelessly carried by the over a hundred users within the trade show meeting area, each of the plurality of portable computers configured to connect to the WLAN and to also operate independently of the WLAN;
- a central database containing content relating to associated users at the trade show meeting area, at least some content of the central database being seller's data obtained from a seller's database, at least some of the seller's data being automatically formatted to the central database's format;
- software configured for loading onto associated portable computers of the plurality of portable computers carried by the over a hundred users, the software when executed on one of the portable computers configured to:
  - (i) download from the central database a selected sub-set of the content before the one of the portable computers connects to the WLAN, the selected sub-set of the content being trade show content personalized to individual users and including information common to all users including a list of attendees, hotel information, meal schedules, and daily events, and specific information to a particular user, wherein the specific information includes data to:
    - (1) generate proposals and agreements for purchase and sale of products;
    - (2) schedule meetings;
    - (3) perform recordkeeping; and
    - (4) identify and memorialize follow-up issues;
  - (ii) generate modifications or additions to the downloaded selected sub-set of the content; and
  - (iii) at least while the one of the portable computers is within the trade show meeting area, occasionally wirelessly connect, via the WLAN, with the central database for synchronization, which includes uploading at least some of the generated modifications or additions to the central database and download other modifications or additions to the downloaded selected sub-set of the content,
  - wherein the download operation (i) and the wirelessly connect operation (iii) each are configured to:
    - connect the one of the portable computers with the central database via an Internet connection; and
    - wherein connection of the one of the portable computers via the Internet connection permits the one of the portable computers (1) to retrieve product price, universal product code and inventory data, (2) to send a populated sales form to a seller's office to begin processing of an order while the one of the portable computers is within the high user concentration environment, and (3) to update a seller's inventory listing on a content sub-set database from data located on an inventory database, of the seller, remote from the high user concentration environment;
  - (iv) integrate a local information stored on the one of the portable computers with the downloaded selected sub-set of the content; and
  - (v) provide the particular user carrying the one of the portable computers with access to both the local information and the downloaded selected sub-set of the content, wherein contact information of the local information and/or the downloaded selected sub-set of the content is searchable;
  - wherein the generation operation (ii) enables a modification or addition to the local information, but the wirelessly connect operation (iii) does not upload the local information to the central database; and
- a local database located on the one of the portable computers carried by the particular user, the local database having the local information not shared with or synchronized with the central database, the local information including all of:
  - names and contact information of other participants;
  - personal notes about other participants;
  - maximum per-unit price another participant is willing to pay for an item;
  - information for preferred buyers including preferred customer discounts, volume discounts and special available products;
  - private communications with a home office; and
  - statistics for product sales and purchases.

9. The database system as set forth in claim 8, wherein:
- the individual users are buyers and sellers in the trade show meeting area, and
- the selected sub-set of the content includes content selected from a group consisting of:
- (i) information about selected buyers wherein the particular user carrying the one of the portable computers is a seller, and
- (ii) information about selected sellers wherein the particular user carrying the one of the portable computers is a buyer.

10. The database system as set forth in claim 8, wherein the selected sub-set of the content includes a form associated with a user other than the particular user carrying the one of the portable computers, and the generation operation (ii) includes populating the form with information pertaining to the particular user carrying the one of the portable computers, which the information was pre-loaded onto the one of the portable computers prior to the populating.

11. The database system as set forth in claim 8, wherein the wirelessly connect operation (iii) downloads the modifications or additions to the downloaded selected sub-set of the content previously uploaded to the central database by other associated portable computers.

12. The database system as set forth in claim 8, wherein the software on the one of the portable computers is further configured to:
(vi) connect with a remote database associated with the particular user carrying the one of the portable computers, the remote database being different from the central database, and
(vii) upload the at least some of the generated modifications or additions to the remote database associated with the particular user.

13. The database system as set forth in claim 12, wherein the generation operation (ii) is further configured to:
download the modifications or additions to the downloaded selected sub-set of the content from the connected remote database.

14. The database system as set forth in claim 8, wherein the wirelessly connect operation (iii) is further configured to:
poll for a wireless connection at preselected time intervals.

* * * * *